United States Patent
Makin et al.

(10) Patent No.: US 11,055,012 B2
(45) Date of Patent: *Jul. 6, 2021

(54) SYSTEMS AND METHODS FOR PERFORMING LIVE MIGRATIONS OF SOFTWARE CONTAINERS

(71) Applicant: Veritas Technologies LLC, Santa Clara, CA (US)

(72) Inventors: Gaurav Makin, Shoreview, MN (US); Kody Kantor, Saint Paul, MN (US); Hao Wen, Falcon Heights, MN (US); Zhichao Cao, Falcon Heights, MN (US); Vallari Mehta, Mountain View, CA (US)

(73) Assignee: Veritas Technologies LLC, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/853,197

(22) Filed: Apr. 20, 2020

(65) Prior Publication Data

US 2020/0249864 A1 Aug. 6, 2020

Related U.S. Application Data

(63) Continuation of application No. 16/197,344, filed on Nov. 20, 2018, now Pat. No. 10,664,186, which is a
(Continued)

(51) Int. Cl.
*H04L 12/00* (2006.01)
*G06F 3/06* (2006.01)
(Continued)

(52) U.S. Cl.
CPC .......... *G06F 3/0647* (2013.01); *G06F 3/0604* (2013.01); *G06F 3/067* (2013.01);
(Continued)

(58) Field of Classification Search
CPC ...... G06F 3/0647; G06F 3/067; G06F 3/0644; G06F 3/0604; G06F 11/1446;
(Continued)

(56) References Cited

U.S. PATENT DOCUMENTS 6,075,938 A 6/2000 Bugnion et al.
6,698,017 B1 2/2004 Adamovits et al.
(Continued)

FOREIGN PATENT DOCUMENTS

JP 2007-066265 A 3/2007
JP 2012-008813 A 1/2012
(Continued)

OTHER PUBLICATIONS

"RunC Open Container Project", URL: http://runc.io, retreived on Oct. 6, 2016, 3 pages.
(Continued)

*Primary Examiner* — Frantz Coby
(74) *Attorney, Agent, or Firm* — FisherBroyles, LLP

(57) ABSTRACT

The disclosed computer-implemented method for performing live migrations of software containers may include (i) identifying a request to migrate a software container from a source computing system to a target computing system while a process executes within the software container, (ii) creating a checkpoint of the process in execution (iii) transferring the checkpoint to the target computing system, (iv) updating the checkpoint recurrently by recurrently creating an incremental checkpoint of the process and merging the incremental checkpoint into the checkpoint, (v) predicting, before updating the checkpoint with an iteration of the incremental checkpoint and based on a size of the iteration of the incremental checkpoint, that finalizing a migration of the software container to the target computing system would meet a predetermined time objective, and (vi) finalizing the
(Continued)

migration of the software container to the target computing system. Various other methods, systems, and computer-readable media are also disclosed.

20 Claims, 4 Drawing Sheets

Related U.S. Application Data continuation of application No. 15/261,596, filed on Sep. 9, 2016, now Pat. No. 10,162,559.

(51) Int. Cl.
*G06F 9/48* (2006.01)
*H04L 29/08* (2006.01)
*G06F 11/14* (2006.01)
*G06F 11/36* (2006.01)

(52) U.S. Cl.
CPC .......... *G06F 3/0644* (2013.01); *G06F 9/4856* (2013.01); *H04L 67/142* (2013.01); *H04L 67/34* (2013.01); *G06F 11/1438* (2013.01); *G06F 11/1446* (2013.01); *G06F 11/3688* (2013.01)

(58) Field of Classification Search
CPC ............ G06F 11/1438; G06F 9/4856; G06F 11/3688; H04L 67/34; H04L 67/142
USPC .................................................. 709/201, 202
See application file for complete search history.

(56) References Cited

U.S. PATENT DOCUMENTS

| | | | |
|---|---|---|---|
| 7,484,208 B1 | 1/2009 | Nelson | |
| 8,078,910 B1 | 12/2011 | Backensto et al. | |
| 8,327,060 B2 | 12/2012 | Heim | |
| 8,347,140 B1 | 1/2013 | Backensto et al. | |
| 8,645,754 B1 | 2/2014 | Backensto et al. | |
| 8,914,789 B2 * | 12/2014 | Barros | G06F 9/5088 717/172 |
| 9,135,117 B2 | 9/2015 | Borda et al. | |
| 9,197,489 B1 | 11/2015 | Vincent | |
| 9,354,921 B2 | 5/2016 | Nelson | |
| 9,450,885 B2 | 9/2016 | Johnsen et al. | |
| 9,552,217 B2 | 1/2017 | Tarasuk-Levin et al. | |
| 9,575,797 B2 | 2/2017 | Linton et al. | |
| 9,720,991 B2 * | 8/2017 | Kritchko | G06F 16/2282 |
| 9,766,945 B2 | 9/2017 | Gaurav et al. | |
| 9,778,923 B2 * | 10/2017 | Kochhar | G06F 8/30 |
| 9,996,562 B2 * | 6/2018 | Higginson | G06F 16/214 |
| 10,162,559 B2 * | 12/2018 | Makin | G06F 3/0644 |
| 10,664,186 B2 * | 5/2020 | Makin | G06F 3/067 |
| 2004/0010787 A1 | 1/2004 | Traut et al. | |
| 2005/0028146 A1 | 2/2005 | Quick | |
| 2007/0260733 A1 | 11/2007 | Havemose et al. | |
| 2010/0071025 A1 | 3/2010 | Devine et al. | |
| 2012/0174104 A1 | 7/2012 | Neogi et al. | |
| 2014/0164829 A1 | 6/2014 | Borda et al. | |
| 2015/0205688 A1 | 7/2015 | Haid et al. | |
| 2015/0370596 A1 | 12/2015 | Fahs et al. | |

FOREIGN PATENT DOCUMENTS

| | | |
|---|---|---|
| JP | 2013-105217 A | 5/2013 |
| JP | 2015-156150 A | 8/2015 |
| JP | 2016-004432 A | 1/2016 |

OTHER PUBLICATIONS

"LXC Linux Containers", URL: http://linuxcontainers.org, retrieved on Oct. 6, 2016, 2 pages.
"Docker", URL: http://www.docker.com, retrieved on Oct. 6, 2016, 7 pages.
"CoreOS rkt", URL: http://coreos.com/blog/rocket on Oct. 6, 2016, Dec. 1, 2014, 6 pages.
"CRIU", URL: http://criu.org/Main_Page, retrieved on Oct. 6, 2016, 2 pages.
"Containers Live Migration—Behind the Scenes", URL: https://www.infoq.com/articles/container-live-migration, retreived on Oct. 6, 2016, 20 pages.
"Virtuozzo", URL: http://virtuozzo.com, retrieved on Oct. 6, 2016, 6 pages.
"Jelastic", URL: http://jelastic.com, retreived on Oct. 6, 2016, 14 pages.
"VMWare", URL: http://www.vmware.com, retreived on Oct. 6, 2016, 4 pages.
U.S. Appl. No. 15/261,596, filed Sep. 9, 2016, now U.S. Pat. No. 10,162,559.
U.S. Appl. No. 16/197,344, filed Nov. 20, 2019.

* cited by examiner

SYSTEMS AND METHODS FOR PERFORMING LIVE MIGRATIONS OF SOFTWARE CONTAINERS

This application is a continuation of U.S. application Ser. No. 16/197,344 filed on Nov. 20, 2018, which is a continuation of U.S. application Ser. No. 15/261,596 filed on Sep. 9, 2016 and issued as U.S. Pat. No. 10,162,559, the disclosures of both of which are incorporated, in their entirety, by this reference.

BACKGROUND

System administrators may wish to migrate resources hosted at one location to another location in order to upgrade hardware, perform system maintenance, manage system resources, or perform load balancing. However, migrating some types of resources according to traditional approaches may cause significant disruption to computing operations.

Software containers may provide safe, consistent, controlled, and/or lightweight operating environments by providing resource and/or namespace isolation for applications that run within the containers. Software containers may facilitate flexible deployment for applications—for example, a software container may be taken down on one system, and an equivalent software container may be deployed on another system. However, redeploying software container while an application executes within the software container may disrupt the statefulness of the application, potentially leading to data loss, interoperational errors with outside systems, and/or dropping sessions with client systems (potentially including sessions involving end users). Thus, the decision of whether to migrate a software container using traditional approaches may entail a costly choice between the benefits of migration and the benefits of application reliability.

The instant disclosure, therefore, identifies and addresses a need for systems and methods for performing live migrations of software containers.

SUMMARY

As will be described in greater detail below, the instant disclosure describes various systems and methods for performing live migrations of software containers by creating an initial application checkpoint (e.g., based on a dump operation that captures stateful properties of the application), transferring the checkpoint to a target computing system, and then creating and transferring incremental application checkpoints (e.g., based on differences in the application state information) until an incremental application checkpoint is small enough (e.g., due to relatively few changes in state) that a prediction indicates that a migration, if undertaken, would be completed within a specified time objective.

In one example, a computer-implemented method for performing live migrations of software containers may include (i) identifying a request to migrate a software container from a source computing system to a target computing system while at least one process executes within the software container, (ii) creating, in response to the request, a checkpoint of the process in execution, wherein the checkpoint includes a representation of a state of the process in execution, (iii) transferring the checkpoint to the target computing system, (iv) updating the checkpoint recurrently by recurrently creating an incremental checkpoint of the process in execution, transferring the incremental checkpoint to the target computing system, and merging the incremental checkpoint into the checkpoint, (v) predicting, before updating the checkpoint with an iteration of the incremental checkpoint and based on a size of the iteration of the incremental checkpoint, that a task including merging the iteration of the incremental checkpoint into the checkpoint and finalizing a migration of the software container to the target computing system would meet a predetermined time objective, and (vi) finalizing the migration of the software container to the target computing system after merging the iteration of the incremental checkpoint into the checkpoint in response to predicting that merging the iteration of the incremental checkpoint into the checkpoint and finalizing the migration of the software container to the target computing system would meet the predetermined time objective.

In one embodiment, the computer-implemented method may further include (i) determining that a size of a most recent iteration of the incremental checkpoint exceeds a predetermined threshold, (ii) discarding the most iteration of the incremental checkpoint and recreating a new full version of the checkpoint in response to determining that the size of the most recent iteration of the checkpoint exceeds the predetermined threshold, and (iii) transferring the new full version of the checkpoint to the target computing system to replace the checkpoint.

In one embodiment, the computer-implemented method may further include throttling the software container at the source computing system by reducing access to a computing resource for the software container and, thereby, reducing a maximum size of the iteration of the incremental checkpoint and enabling the task to meet the predetermined time objective.

In one embodiment, the checkpoint may include a stored representation of (i) a state of application memory of the process, (ii) a process handle of the process, (iii) a file handle held by the process, and/or (iv) a socket held by the process.

In one embodiment, the software container may include a sandboxed environment wherein the process executing within the software container performs system calls to an operating system that hosts the software container.

In one embodiment, the incremental checkpoint may include a representation of a difference between a current state of the process and a most recent previous version of the checkpoint.

In some examples, finalizing the migration may include: restoring the checkpoint into a new software container at the target computing system and redirecting a communication path to point to the new software container at the target computing system instead of pointing to the software container at the source computing system.

In some examples, redirecting the communication path may include reassigning, within a software defined network, an internet protocol address previously allocated to the software container at the source computing system to the new software container at the target computing system.

In one embodiment, the migration of the software container may include the process maintaining a stateful session with a client system that begins with the client system communicating with the process at the source computing system and concludes with the client system communicating with the process at the target computing system.

In one embodiment, a system for implementing the above-described method may include (i) an identification module, stored in memory, that identifies a request to migrate a software container from a source computing system to a target computing system while at least one process executes within the software container, (ii) a creation module, stored in memory, that creates, in response to the request, a checkpoint of the process in execution, wherein the checkpoint includes a representation of a state of the process in execution, (iii) a transferring module, stored in memory, that transfers the checkpoint to the target computing system, (iv) an updating module, stored in memory, that updates the checkpoint recurrently by recurrently creating an incremental checkpoint of the process in execution, transferring the incremental checkpoint to the target computing system, and merge the incremental checkpoint into the checkpoint, (v) a prediction module, stored in memory, that predicts, before updating the checkpoint with an iteration of the incremental checkpoint and based on a size of the iteration of the incremental checkpoint, that a task including merging the iteration of the incremental checkpoint into the checkpoint and finalizing a migration of the software container to the target computing system would meet a predetermined time objective, (vi) a finalizing module, stored in memory, that finalizes the migration of the software container to the target computing system after merging the iteration of the incremental checkpoint into the checkpoint in response to predicting that merging the iteration of the incremental checkpoint into the checkpoint and finalize the migration of the software container to the target computing system would meet the predetermined time objective, and (vii) at least one physical processor configured to execute the identification module, the creation module, the transferring module, the updating module, the prediction module, and the finalizing module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a request to migrate a software container from a source computing system to a target computing system while at least one process executes within the software container, (ii) create, in response to the request, a checkpoint of the process in execution, wherein the checkpoint includes a representation of a state of the process in execution, (iii) transfer the checkpoint to the target computing system, (iv) update the checkpoint recurrently by recurrently creating an incremental checkpoint of the process in execution, transferring the incremental checkpoint to the target computing system, and merging the incremental checkpoint into the checkpoint, (v) predict, before updating the checkpoint with an iteration of the incremental checkpoint and based on a size of the iteration of the incremental checkpoint, that a task including merging the iteration of the incremental checkpoint into the checkpoint and finalizing a migration of the software container to the target computing system would meet a predetermined time objective, and (vi) finalize the migration of the software container to the target computing system after merging the iteration of the incremental checkpoint into the checkpoint in response to predicting that merging the iteration of the incremental checkpoint into the checkpoint and finalizing the migration of the software container to the target computing system would meet the predetermined time objective.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
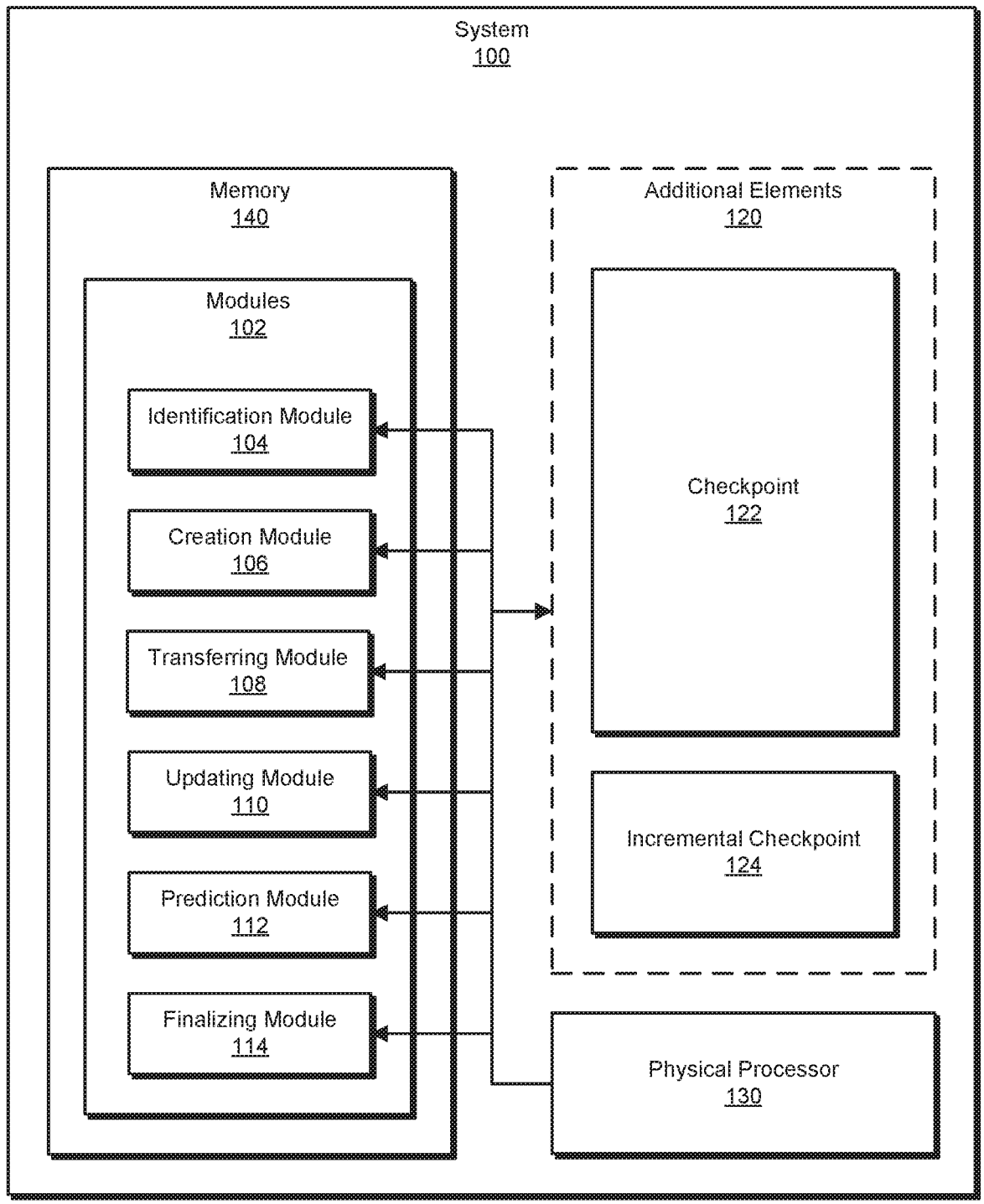
FIG. 1 is a block diagram of an example system for performing live migrations of software containers.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for performing live migrations of software containers. As will be explained in greater detail below, by creating an initial application checkpoint (e.g., based on a dump operation that captures stateful properties of the application), transferring the checkpoint to a target computing system, and then creating and transferring incremental application checkpoints (e.g., based on differences in the application state information) until an incremental application checkpoint is small enough (e.g., due to relatively few changes in state) that a prediction indicates that a migration, if undertaken, would be completed within a specified time objective, the systems and methods described herein may facilitate efficient and effective live migrations of software containers. In addition, in some examples, by throttling resources available to a software container, the systems and methods described herein may reduce the size of incremental application checkpoints and thereby potentially improve the probability that an incremental application checkpoint can be applied quickly enough to complete a migration within a time objective.

Moreover, the systems and methods described herein may improve the functioning and/or performance of a computing system that hosts a software container by facilitating live migrations away from the computing system (to, e.g., reduce the computing load on the computing system, facilitate hardware and/or software upgrades of the computing system, facilitate maintenance operations on the computing system, and/or free resources for executing other applications on the computing system). In addition, the systems and methods described herein may improve the functioning and/or performance of a computing system that is a target of a live migration of a software container by facilitating the target computing system to host the software container in such a way that an application within the software container can provide an uninterrupted service. Furthermore, the systems and methods described herein may improve the functioning and/or performance of a distributed computing system by facilitating the seamless transfer of applications from one system to another. In some examples, the systems and methods described herein may improve the functioning of one or more computing systems may reducing the computational burden of live migration operations and/or by increasing the reliability of live migration operations.

Figure 2:
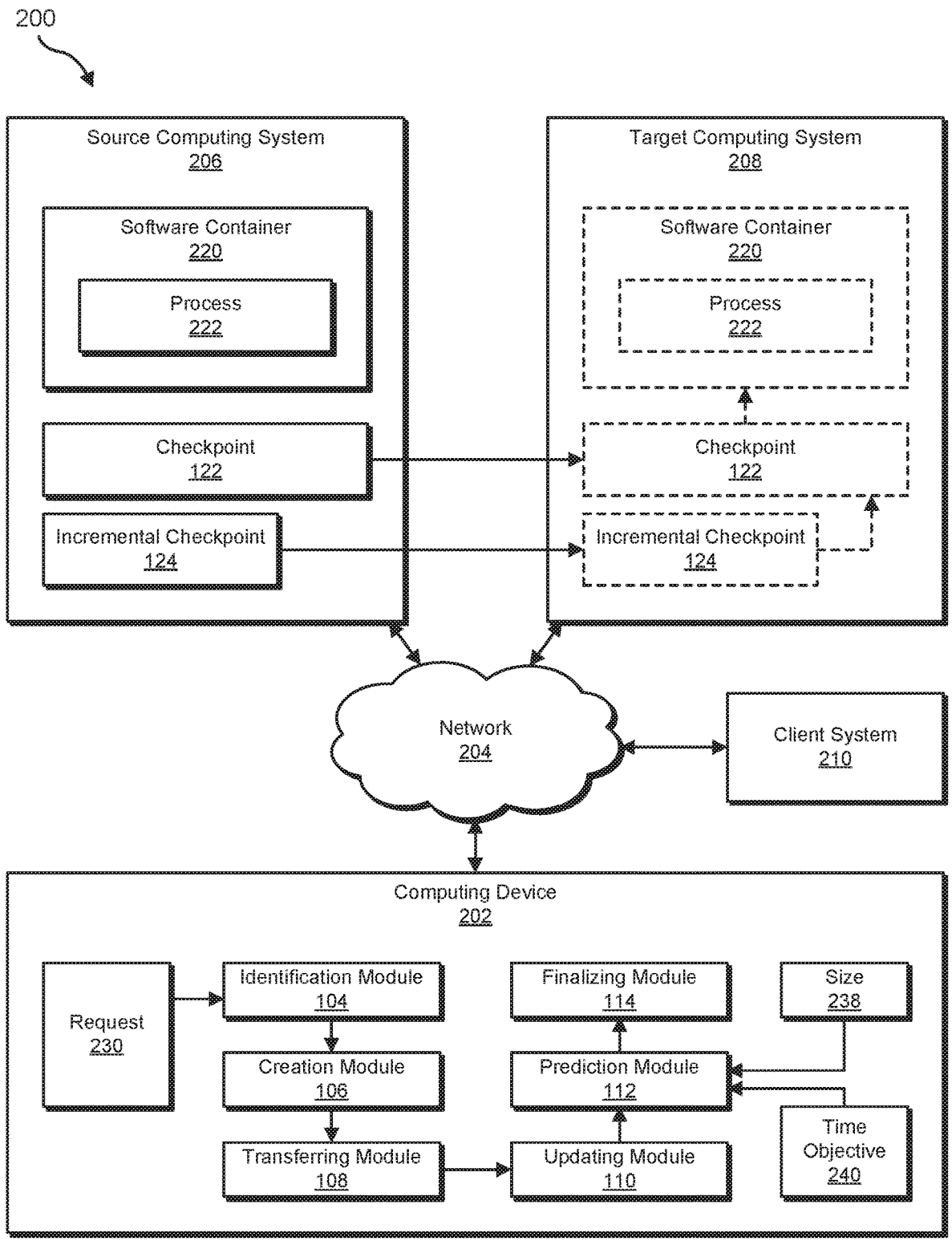
FIG. 2 is a block diagram of an additional example system for performing live migrations of software containers.

The following will provide, with reference to FIGS. 1-2, detailed descriptions of example systems for performing live migrations of software containers. Detailed descriptions of corresponding computer-implemented methods will also be provided in connection with FIGS. 3-4.

FIG. 1 is a block diagram of exemplary system 100 for performing live migrations of software containers. As illustrated in this figure, exemplary system 100 may include one or more modules 102 for performing one or more tasks. For example, and as will be explained in greater detail below, exemplary system 100 may include an identification module 104 that identifies a request to migrate a software container from a source computing system to a target computing system while at least one process executes within the software container. Exemplary system 100 may additionally include a creation module 106 that creates, in response to the request, a checkpoint of the process in execution, wherein the checkpoint includes a representation of a state of the process in execution. Exemplary system 100 may also include a transferring module 108 that transfers the checkpoint to the target computing system. Exemplary system 100 may additionally include an updating module 110 that updates the checkpoint recurrently by recurrently creating an incremental checkpoint of the process in execution, transferring the incremental checkpoint to the target computing system, and merging the incremental checkpoint into the checkpoint. Exemplary system 100 may also include a prediction module 112 that predicts, before updating the checkpoint with an iteration of the incremental checkpoint and based on a size of the iteration of the incremental checkpoint, that a task that includes merging the iteration of the incremental checkpoint into the checkpoint and finalizing a migration of the software container to the target computing system would meet a predetermined time objective. Exemplary system 100 may additionally include a finalizing module 114 that finalizes the migration of the software container to the target computing system after merging the iteration of the incremental checkpoint into the checkpoint in response to predicting that merging the iteration of the incremental checkpoint into the checkpoint and finalize the migration of the software container to the target computing system would meet the predetermined time objective. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202, source computing system 206, and/or target computing system 208). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate performing live migrations of software containers. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include one or more additional elements, such as additional elements 120. For example, example system may include a checkpoint 122 and an incremental checkpoint 124. Checkpoint 122 may represent any type or form of state information of a process and/or a software container. Incremental checkpoint 124 may represent any type or form of state information of a process and/or software container that is new and/or changed relative to a previous state.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a source computing system 206 and/or target computing system 208 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202, source computing system 206, and/or target computing system 208, enable computing device 202, source computing system 206, and/or target computing system 208 to perform live migrations of software containers.

Computing device 202 generally represents any type or form of computing device capable of reading computer-executable instructions. For example, computing device 202 may represent a data center management system. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, or any other suitable computing device.

Source computing system 206 and target computing system 208 generally represent any type or form of computing device that is capable of hosting a software container. Additional examples of source computing system 206 and target computing system 208 include, without limitation, application servers, storage servers, database servers, and/or web servers configured to run certain software applications and/or provide various storage, database, and/or web services. Although each is illustrated as a single entity in FIG. 2, source computing system 206 and target computing system 208 each may include and/or represent a plurality of servers that work and/or operate in conjunction with one another.

Network 204 generally represents any medium or architecture capable of facilitating communication or data transfer. In one example, network 204 may facilitate communication between computing device 202, source computing system 206, and/or target computing system 208. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), a Storage Area Network (SAN), m the Internet, Power Line Communications (PLC), a cellular network (e.g., a Global System for Mobile Communications (GSM) network), portions of one or more of the same, variations or combinations of one or more of the same, or any other suitable network.

Many other devices or subsystems may be connected to computing system 100 in FIG. 1 and/or computing system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Computing systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
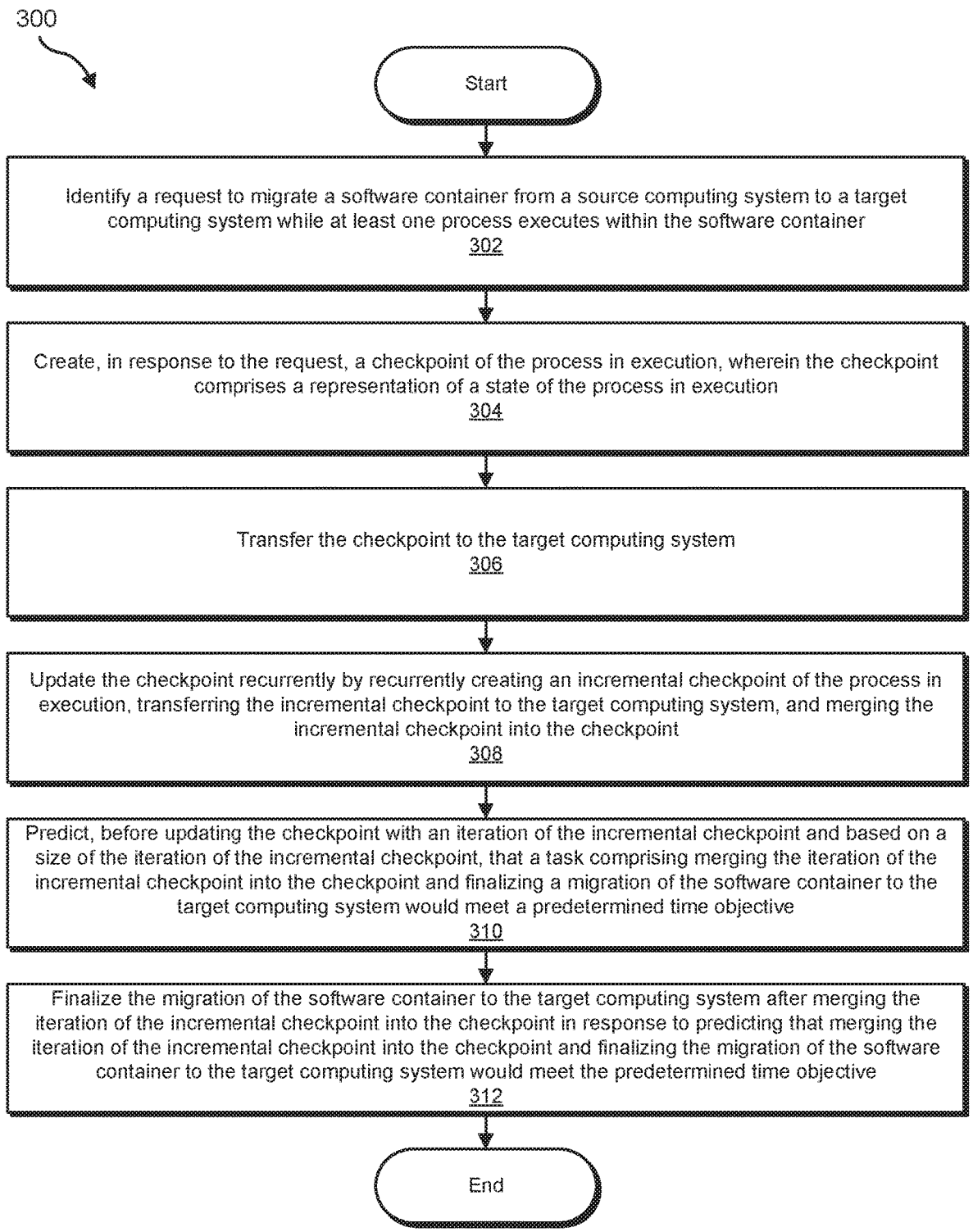
FIG. 3 is a flow diagram of an example method for performing live migrations of software containers.

FIG. 3 is a flow diagram of an example computer-implemented method 300 for performing live migrations of software containers. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may identify a request to migrate a software container from a source computing system to a target computing system while at least one process executes within the software container. For example, identification module 104 may, as part of computing device 202 in FIG. 2, identify request 230 to migrate software container 220 from source computing system 206 to target computing system 208 while at least one process 222 executes within software container 220.

The term "migration," as used herein, generally refers to any operation for transferring a software container from one host system to another host system while preserving the state of the software container. For example, a software container may include and/or host one or more processes; accordingly, migrating the software container may include transferring the one or more processes to a reconstructed instance of the software container on a new host while preserving the state of the one or more processes. Thus, the term "migration" may refer to a live migration. As used herein, the term "live migration" may refer to any migration that (1) minimizes and/or eliminates downtime for a software container, process, and/or application, (2) that occurs while the software container, process, and/or application is in execution, and/or that (3) provides continuity of statefulness and/or function of the software container, process, and/or application such that volatile states (e.g., states represented in volatile memory) are preserved across the migration and/or such that interoperations (e.g., communication sessions) with the software container, process, and/or application by outside systems continue without interruption and/or loss of state. Thus, in some examples, a live migration may allow a client system to maintain a stateful session with the software container, process, and/or application before, during, and after the live migration process.

In one example, the migration of the software container may include the process maintaining a stateful session with a client system that begins with the client system communicating with the process at the source computing system and concludes with the client system communicating with the process at the target computing system.

The term "software container," as used herein, generally refers to any instance of virtualization and/or process isolation at the operating system level. In some examples, a software container may correspond with an operating system namespace. For example, a software container may apply a namespace to one or more processes such that the processes are isolated from (e.g., cannot view and/or access) one or more resources outside of the namespace. Thus, a process within a namespace may be able to view other processes within the namespace but may be unable to view processes operating from the same underlying kernel but outside the namespace. In some examples, a software container may isolate processes within the software container from accessing one or more resources outside the software container. For example, a software container may apply a control group to one or more processes so as to limit the amount of processor availability, of volatile memory, of storage bandwidth, and/or of network bandwidth visible and/or usable to the processes within the software container beyond the physical limitations native to the host computing system and/or any other system-wide limitations.

In some examples, the software container may directly access services provided by the kernel of the system hosting the software container. For example, a software container may provide greater efficiency for encapsulating an application than would a virtual machine by not using hardware virtualization. In some examples, a software container may present to one or more processes within the software container a view of a separate server even though the software container may be hosted (e.g., along with one or more additional software containers) on a host system. Thus, a single host system may host many software containers that may operate in isolation from one another. Accordingly, the software container may include one or more system files that, in concert with the underlying kernel and hardware of the host system, may provide a full virtualized server. In some examples, the software container may provide a separate file system to the processes within the software container.

In one example, the software container may include a sandboxed environment wherein the process executing within the software container performs system calls to an operating system that hosts the software container.

The term "process," as used herein, generally refers to any program in execution (e.g., an instantiation and/or running copy of a program). In some examples, a process may include multiple processes, threads, and/or subprocesses. Processes may conduct stateful operations by executing instructions in specified orders and/or by reading from and writing to volatile memory.

The request to migrate the software container may include any suitable command, instruction, and/or configuration data indicating that the migration of the software container is to occur. Thus, identification module 104 may identify the request in any suitable context. For example, identification module 104 may identify the request arising in response to a fault, failure, and/or error detected in the source computing system that hosts the software container. Additionally or alternatively, identification module 104 may identify the request by identifying an instruction to balance a load across multiple computing systems that include the source computing system and the target computing system (e.g., by reducing the load on the source computing system). In some examples, identification module 104 may identify the request by receiving an instruction from an administrator to migrate the software container. In some examples, identification module 104 may identify the request by identifying an instruction to update software on the source computing system, to debug the source computing system, to audit the source computing system, and/or to shut down the source computing system. In some examples, identification module 104 may identify the request by identifying a policy (e.g., an information security policy) that prohibits the software container to be located at the source computing system and/or that prohibits the software container from sharing the source computing system with another identified application and/or data object. In some examples, the request to migrate the software container may specify that the process is in execution within the software container and/or that an outside system is in the midst of a stateful session with the process. In these examples, the systems described herein may identify the request as a request to perform a live migration (e.g., in order to preserve the state of the process in execution and/or the stateful session with the outside system).

In some examples, one or more of the systems described herein (e.g., identification module 104) may determine the type of migration to perform and/or prepare for the migration. Using FIG. 4 as an example, at step 402 identification module 104 may predict whether the systems described herein can meet a downtime objective when performing the migration. As will be explained in greater detail below, systems described herein may predict whether the downtime objective can be met in any of a variety of ways and based on any of a variety of information, including, e.g., the memory size of the software container. If identification module 104 predicts that the downtime objective would not be met, at step 404 identification module 104 may determine whether the migration is forced. For example, identification module 104 may identify a migration setting (e.g., set by an administrator) specifying that the migration is forced. Additionally or alternatively, identification module 104 may determine that the process will terminate at the source computing system whether or not the migration occurs (e.g., due to a fault and/or a termination procedure affecting the process that is already underway at the source computing system) and so may determine that delaying or canceling the migration would not improve the continuity of the execution of the process. If identification module 104 determines that the migration is not to be forced, at step 406 identification module 104 may cancel the migration attempt. Otherwise, if identification module 104 determines that the migration is to be forced, identification module 104 may, at step 408, proceed with the migration, as will be explained in greater detail below. Additionally, in some examples, identification module 104 may initiate a procedure that both migrates the software container in a timely fashion and attempts to perform the migration as a live migration (e.g., within the downtime objective) despite the prediction that such an attempt would be unsuccessful.

If identification module 104, at step 402, predicts that the migration will successfully meet the downtime objective, identification module 104 may proceed to step 410 and prepare for the migration. For example, identification module 104 may identify dependencies for the software container and determine whether each resource depended upon by the software container is available on the target computing system (including, e.g., sufficient computing resources such as storage space, input/output bandwidth, processor availability, and/or memory availability; an adequate kernel version; and/or one or more applications that may interoperate with the software container). If any dependencies are missing, identification module 104 may provide the target computing system with the missing dependencies. For example, identification module 104 may transfer one or more data volumes used by the software container to the target computing system. In addition, identification module 104 may provide an application container image to the target computing system. In some examples, identification module 104 may identify one or more network settings of the software container (including, e.g., an internet protocol address assigned to the container). Additionally or alternatively, identification module 104 may identify one or more data volumes assigned to the software container. In some examples, identification module 104 may create an empty software container on the target computing system (e.g., with configuration settings that match the software container on the source computing system).

In some examples, identification module 104 may prepare for the migration by downloading, to the target computing system, a software container image (e.g., an image for a software container hosting an application that matches the application hosted by the software container being migrated).

Returning to FIG. 3, at step 304, one or more of the systems described herein may create, in response to the request, a checkpoint of the process in execution, wherein the checkpoint may include a representation of a state of the process in execution. For example, creation module 106 may, as part of computing device 202 in FIG. 2, create, in response to request 230, checkpoint 122 of process 222 in execution, wherein checkpoint 122 may include a representation of a state of process 222 in execution.

The term "checkpoint," as used herein, may refer to any point-in-time representation of the state of a process. Accordingly, the checkpoint may preserve otherwise volatile state information. For example, the checkpoint may include a stored representation of (i) a state of application memory of the process, (ii) a process handle of the process, (iii) a file handle held by the process, and/or (iv) a socket held by the process. Additionally or alternatively, the checkpoint may include a representation of one or more relationships between processes, one or more process threads, one or more pipes between processes, and/or one or more communications between processes. Generally, the checkpoint may include any state information that may be used to reconstruct the state of a process in execution.

Creation module 106 may create the checkpoint of the process in any suitable manner. For example, creation module 106 may create the checkpoint of the process by freezing the process and then dumping state information of the process to one or more files and/or to non-volatile storage. In some examples, creation module 106 may create a full initial checkpoint of the process (e.g., that contains complete state information for fully reconstructing the process in execution as it was at the point-in-time of the initial checkpoint).

In some examples, creation module 106 may create the checkpoint by identifying a high-speed storage device and dumping the state information of the process to the high-speed storage device. For example, creation module 106 may dump the state information to a temporary file storage system (e.g., a file system that stores data in volatile memory). As will be explained in greater detail below, one or more systems described herein may immediately transfer the state information from the high-speed storage device at the source computing system to the target computing system.

Figure 4:
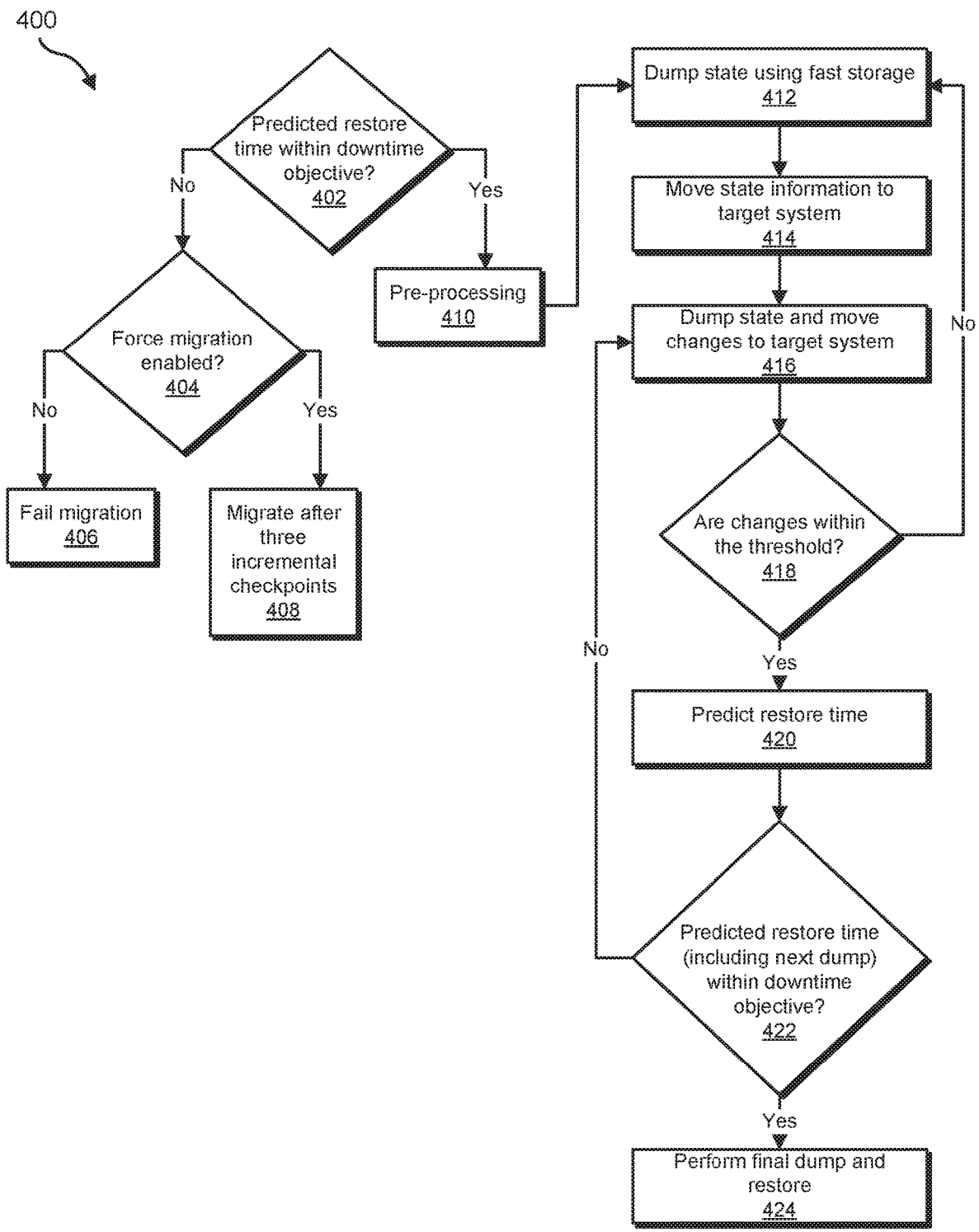
FIG. 4 is a block diagram of an additional example method for performing live migrations of software containers.

Using FIG. 4 as an example, at step 412 creation module 106 may dump the state of the process using a fast storage resource.

Returning to FIG. 3, at step 306, one or more of the systems described herein may transfer the checkpoint to the target computing system. For example, transferring module 108 may, as part of computing device 202 in FIG. 2, transfer checkpoint 122 to target computing system 208.

Transferring module 108 may transfer the checkpoint to the target computing system in any suitable manner. For example, transferring module 108 may transfer one or more files storing the checkpoint from the source computing system to the target computing system. In some examples, as discussed earlier, the systems described herein may have stored the checkpoint on a high-speed storage device (e.g., such as a temporary file system that stores data in volatile memory). In these, examples, transferring module 108 may transfer the checkpoint (e.g., in the form of files stored on the high-speed storage device) directly from volatile memory to the target computing system, avoiding the delay of writing the checkpoint data to non-volatile storage. In some examples, transferring module 108 may transfer the checkpoint to the target computing system using remote direct memory access (e.g., a zero-copy operation delivering the checkpoint from the memory of the source computing system, across the network, to the memory of the target computing system), thereby potentially avoiding writing the checkpoint data to non-volatile storage on either the source computing system or the target computing system.

Using FIG. 4 as an example, at step 414 transferring module 108 may transfer the checkpoint to the target computing system.

Returning to FIG. 3, at step 308, one or more of the systems described herein may update the checkpoint recurrently by recurrently creating an incremental checkpoint of the process in execution, transferring the incremental checkpoint to the target computing system, and merge the incremental checkpoint into the checkpoint. For example, updating module 110 may, as part of computing device 202 in FIG. 2, update checkpoint 122 recurrently by recurrently creating incremental checkpoint 124 of process 222 in execution, transferring incremental checkpoint 124 to the target computing system, and merge incremental checkpoint 124 into checkpoint 122.

The term "incremental checkpoint," as used herein, generally refers to any checkpoint data representing changes to the state of a process since a previous checkpoint or incremental checkpoint. Thus, an incremental checkpoint applied to a full checkpoint at a previous point in time may result in a full checkpoint representing the state of the process at the time of the incremental checkpoint. Accordingly, the incremental checkpoint may include a representation of a difference between a current state of the process and a most recent previous version of the checkpoint.

Updating module 110 may create the incremental checkpoint in any suitable manner. For example, updating module 110 may create the incremental checkpoint using any of the techniques described above for creating the initial checkpoint. Additionally, in some examples, updating module 110 may dump only dirty memory pages (e.g., memory pages written to since the last full or incremental checkpoint).

Updating module 110 may transfer the incremental checkpoint in any suitable manner. For example, updating module 110 may transfer the incremental checkpoint using any of the techniques described above for transferring the initial checkpoint to the target computing system.

Updating module 110 may merge the incremental checkpoint into the checkpoint in any suitable manner. For example, updating module 110 may merge the incremental checkpoint into the checkpoint simply by transferring the incremental checkpoint to a location at the target computing system where new information (e.g., changed memory pages) in the incremental checkpoint overwrites old information (e.g., previous versions of the memory pages). In some examples, updating module 110 may merge the incremental checkpoint into the checkpoint by modifying a reference pointing to an old version of a portion of the checkpoint (e.g., a previous version of a memory page) to a new version of the portion of the checkpoint (e.g., a current version of the memory page as of the incremental checkpoint). In some examples, updating module 110 may merge the incremental checkpoint into the checkpoint by adding the incremental checkpoint to a collection of checkpoint data such that a full checkpoint current as of the incremental checkpoint may be reconstituted from the collection of checkpoint data.

As may be appreciated, updating the checkpoint recurrently may involve creating, transferring, and merging the incremental checkpoint any number of times (e.g., only once or several times). However, as will be explained in greater detail below, systems described herein may use any of a variety of techniques to reduce the number of updates to the checkpoint before proceeding with the migration of the software container.

In one example, updating module 110 described herein may, in light of the size of the incremental checkpoint, restart the checkpoint by creating a new full checkpoint. For example, updating module 110 may determine that a size of a most recent iteration of the incremental checkpoint exceeds a predetermined threshold, (ii) discard the most iteration of the incremental checkpoint and recreate a new full version of the checkpoint in response to determining that the size of the most recent iteration of the checkpoint exceeds the predetermined threshold, and (iii) transfer the new full version of the checkpoint to the target computing system to replace the checkpoint. In some examples, updating module 110 may determine that the size of the most recent iteration of the incremental checkpoint exceeds the predetermined threshold by determining that the size of the most recent iteration of the incremental checkpoint as a proportion of the memory size of the software container exceeds a predetermined percentage. For example, updating module 110 may determine that the software container is changing state information so quickly that migrating the software container upon committing an incremental checkpoint to the target computing system would be unlikely (e.g., as indicated by the predetermined threshold) to meet a time objective.

In some examples, updating module 110 may throttling the software container at the source computing system by reducing access to a computing resource for the software container and, thereby, reducing a maximum size of the iteration of the incremental checkpoint and enabling the task to meet the predetermined time objective. For example, updating module 110 may, in response to determining that the size of the most recent iteration of the incremental checkpoint exceeds the predetermined threshold, throttle the software container. Updating module 110 may throttle the software container in any suitable manner. For example, updating module 110 may decrease processor availability to one or more processes within the software container (e.g., thereby potentially slowing the rate at which state changes may occur within the software container). Additionally or alternatively, updating module 110 may decrease network resource availability (e.g., bandwidth, connection number, etc.) to one or more processes within the software container. In some examples, updating module 110 may decrease storage input/output bandwidth to one or more processes within the software container. In various examples, updating module 110 may reduce access to one or more computing resources for the software container by reducing access to the computing resources for a control group associated with one or more processes executing within the container.

Using FIG. 4 as an illustration, at step 416 updating module 110 may dump the state of the software container (e.g., dumping and/or preserving only the changed portions of the state) to create an incremental checkpoint and then transfer the incremental checkpoint to the target computing system. In some examples, at step 418 (e.g., occurring before, during, and/or after step 416) updating module 110 may determine whether the size of the incremental checkpoint (e.g., the size of the changes to the state of the software container) falls within a predetermined threshold. If the size of the incremental checkpoint does not fall within the predetermined threshold, the systems described herein may proceed to step 412 (and, in some examples, throttle the software container at the source computing system to improve the chances of falling within the threshold in subsequent checks). If the size of the incremental checkpoint does fall within the predetermined threshold, the systems described herein may proceed to step 420.

Returning to FIG. 3, at step 310, one or more of the systems described herein may predict, before updating the checkpoint with an iteration of the incremental checkpoint and based on a size of the iteration of the incremental checkpoint, that a task including merging the iteration of the incremental checkpoint into the checkpoint and finalizing a migration of the software container to the target computing system would meet a predetermined time objective. For example, prediction module 112 may, as part of computing device 202 in FIG. 2, predict, before updating checkpoint 122 with an iteration of incremental checkpoint 124 and based on size 238 of the iteration of incremental checkpoint 124, that a task including merging the iteration of incremental checkpoint 124 into checkpoint 122 and finalizing a migration of software container 220 to target computing system 208 would meet a time objective 240.

The term "time objective," as used herein, generally refers to any objective defining an acceptable length of time for a software container, a process, and/or an application to be frozen, offline, and/or out of communication. The predetermined time objective may be determined according to any of a variety of criteria. For example, prediction module 112 may determine the time objective based on the length of time that a communication session will remain alive. For example, a transmission control protocol (TCP) session may use a timeout length of 60 seconds. Accordingly, a client system in communication with the process via the TCP session may lose the session (and, thus, a stateful communication with the process) if the time span for which the software container is offline during the migration exceeds 60 seconds. Thus, prediction module 112 may determine the time objective to be 60 seconds. In some examples, prediction module 112 may determine the time objective by identifying an active communication session, determining, predicting, and/or estimating the session length based on information about the active communication session, and then setting the time objective to accommodate the session length (e.g., to avoid dropping the session). Additionally or alternatively, prediction module 112 may determine the time objective by determining a service level objective (e.g., based on a defined service level agreement). Thus, prediction module 112 may determine what time objective is compatible with the service level objective.

In some examples, prediction module 112 may determine the time objective based on a priority assigned to one or more applications interoperating with the process (e.g., reducing the permissible downtime as the priority increases). Additionally or alternatively, prediction module 112 may determine the time objective based on a calculated optimal throughput for an application that interoperates with the process (e.g., increasing the permissible downtime up to the point at which the potential throughput between the interoperating application and the process would fall below the calculated optimal level). In some examples, prediction module 112 may reduce the permissible downtime in response to determining that the process is engaged in a user-facing communication session. In some examples, prediction module 112 may determine the time objective based on a real-time constraint defined for a real-time computing system. As may be appreciated by the above examples, in some examples prediction module 112 may dynamically determine the time objective. Additionally or alternatively, prediction module 112 may use a consistently defined time objective. In some examples, prediction module 112 may use an administrator-defined time objective and/or may use a time objective specified within the request to perform the migration.

Prediction module 112 may predict whether finalizing the migration with the incremental checkpoint would meet the time objective in any of a variety of ways. For example, prediction module 112 may predict (i) the time it would take to instantiate the software container at the target computing system using an up-to-date checkpoint and (ii) the time it would take to incorporate the next incremental checkpoint into the checkpoint at the target system and determine whether the sum of the two amounts of time would fall within the time objective. For example, prediction module 112 may predict the time it would take to instantiate the software container based on the memory size of the software container and/or based on one or more characteristics of the target computing system. In addition, prediction module 112 may predict the time it would take to incorporate the next incremental checkpoint into the checkpoint at the target system based on the size (or a prediction of the size) of the next incremental checkpoint, one or more characteristics of the source computing system, one or more characteristics of the target computing system, one or more characteristics of the network connecting the source computing system and the target computing system, and/or one or more characteristics of the process (e.g., behavioral patterns of an application represented by the process). In some examples, prediction module 112 may use machine learning techniques (e.g., trained on observations of previous migrations using one or more of the variables described above) to predict whether finalizing the migration with the incremental checkpoint would meet the time objective.

Using FIG. 4 as an example, at step 420 prediction module 112 may predict how long it would take to restore the checkpoint to the software container at the target computing system. At step 422, prediction module 112 may predict whether the sum of the predicted time to restore the checkpoint and the time to create, transfer, and merge the next incremental checkpoint would meet the time objective. If prediction module 112 predicts that the time objective would be missed, the systems described herein may proceed to step 416. If prediction module 112 predicts that the time objective would be met, the systems described herein may proceed to step 424.

Returning to FIG. 3, at step 312, one or more of the systems described herein may finalize the migration of the software container to the target computing system after merging the iteration of the incremental checkpoint into the checkpoint in response to predicting that merging the iteration of the incremental checkpoint into the checkpoint and finalize the migration of the software container to the target computing system would meet the predetermined time objective. For example, finalizing module 114 may, as part of computing device 202 in FIG. 2, finalize the migration of software container 220 to target computing system 208 after merging the iteration of incremental checkpoint 124 into checkpoint 122 in response to predicting that merging the iteration of incremental checkpoint 124 into checkpoint 122 and finalize the migration of software container 220 to target computing system 208 would meet time objective 240.

Finalizing module 114 may finalize the migration of the software container to the target computing system in any suitable manner. In some examples, finalizing module 114 may restore the checkpoint into a new software container at the target computing system (e.g., previously created during a pre-processing phase after the migration was requested) and redirecting a communication path to point to the new software container at the target computing system instead of pointing to the software container at the source computing system. In some examples, finalizing module 114 may finalize the communication path by reassigning, within a software defined network, an internet protocol address previously allocated to the software container at the source computing system to the new software container at the target computing system.

In one example, finalizing module 114 may (i) disconnect the software container at the source computing system from the network, (ii) create, transfer, and merge a final incremental checkpoint, (iii) flush pending input/output operations from the file system cache corresponding to the software container to storage, (iv) release (e.g., via a software-defined network) the internet protocol address used by the software container at the source computing system, (v) configure (e.g., via the software-defined network) the software container at the destination computing system with the internet protocol address previously used at the source computing system, and (vi) restore the software container at the target computing system from the checkpoint.

Using FIG. 4 as an example, at step 424 finalizing module 114 may perform a final incremental checkpoint of the software container and restore the software container at the target computing system from the checkpoint at the target computing system.

As explained above in connection with FIGS. 1-4, systems described herein may live migrate a stateful application (e.g., a database application) running in a software container (e.g., OPEN CONTAINER PROJECT RUNC, LXC, DOCKER, COREOS ROCKET, etc.) from one host to another with software-defined storage for containers. These systems may provide high performance for live migrations with acceptable downtime for applications so that that are no drops in connections from clients connected to a stateful application.

In some examples, an application and all of its dependencies may be bundled into a single container that is independent from the host version of the kernel, the platform distribution, or the deployment model. Container images may be small, facilitating rapid delivery and reducing the time to deploy new application containers. The systems described herein may provide high availability and high performance of applications across container migration. These systems may efficiently migrate the entire application state (including, e.g., memory, file handles, process handles, and sockets) to the destination host by using incremental checkpoints to ensure minimal downtime for the application. The systems described herein may orchestrate container migration related activities and ensure that the status of applications remain consistent after migration. For example, an underlying storage system, may verify that storage is available on the destination host. The systems described herein may flush all pending input/output operations to ensure consistent data. These systems may retain network connectivity following container migration without changing the internet protocol address or losing the connection. These systems may also collect status information for containers that are to be migrated and the actual downtime for each migration. The systems described herein may feed information to a decision engine, which may use machine learning to optimize the migration policy dynamically.

Before initiating a migration, the systems described herein may check whether the downtime requirement can be met based on the container memory size and the predicted restore time. The migration process may then proceed to pre-migration operations if the downtime requirement can be met or if the migration is forced (in which case, the systems described herein may exclude further checks in the migration process).

In a pre-migration stage, the systems described herein may download an application container image if it is not yet available on the destination host and may verify that prerequisite resources are available on the destination host. These systems may also create an empty container on the destination host with configurations that match the container to be migrated. These systems may also register, for the empty container, the internet protocol address used for the container to be migrated to ensure no change in internet protocol address or network connection loss after migration.

In an incremental checkpoint stage, the systems described herein may capture the application container state incrementally and move it to the destination host. These systems may determine the number of checkpoints to take adaptively to minimize the downtime. The first checkpoint may include the entire memory of the container. The systems described herein may transfer the checkpoint files to the destination host (e.g., to high performance storage, such as a temporary file system, a peripheral component interconnect express (PCIe) connected solid state drive, etc. to facilitate the quick restoration of the container to minimize the downtime). The systems described herein may create an incremental checkpoint and move the checkpoint files to the destination host. These systems may check the percentage of container memory that is changed for all incremental checkpoints. If the percentage exceeds a threshold determined by the decision engine, these systems may determine that the memory change is too large and the migration is no longer appropriate (e.g., because the restore time may be too long and fail to meet the downtime requirement). In this case, the incremental checkpoint stage may start over with a new initial full checkpoint. If the percentage does not exceed the threshold, the systems described herein may predict the time needed to perform the next checkpoint and to predict the time needed to restore from the checkpoint. If the sum of the next checkpoint time and the newly estimated restore time is less than the maximum downtime, the systems described herein may proceed to migration. Otherwise, these systems may continue to perform incremental checkpoints and predictions until the downtime objective is met.

In a migration stage, the systems described herein may disconnect the container at the source host from the network and execute a final checkpoint. At the same time, these systems may flush all pending input/output operations from the file system cache to disk and verify that all the data is consistent in storage before and after the container migration. Because the size of final checkpoint may be constrained by checking each incremental checkpoint for size before treating any incremental checkpoint as the final checkpoint, the time required to take the final checkpoint may also be constrained. After the final checkpoint, the systems described herein may release the internet protocol address so that it may be reused on the destination host. In addition, the container may be restored from a collection of checkpoint files on the destination host.

The systems described herein may also take into account when the percentage of memory change for the storage container is large (e.g., greater than 10%). When restarting the incremental checkpoint stage, these systems may throttle storage speeds for the application within storage container (e.g., by changing service level agreement policies for the application). For example, the application may initially be configured with a policy providing 50,000 input/output operations per second and may be throttled by switching to a policy providing 5,000 input/output operations per second. This may lead to fewer changes to memory and storage, which may reduce the incremental checkpoint size going forward, thereby allowing a subsequent check for an incremental checkpoint size to pass and allow the migration to finalize.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method, at least a portion of the method being performed by a computing device comprising at least one processor, the method comprising:
    migrating a software container from a source computing system to a target computing system while a process executes within the software container, the migrating comprising:
    creating a checkpoint comprising a representation of a state of the process;
    transferring the checkpoint to the target computing system;
    subsequent to creating the checkpoint, creating an incremental checkpoint comprising a representation of at least one change in the state of the process;
    determining, based on the incremental checkpoint, that migrating the software container from the source computing system to the target computing system will be completed within a specified time objective; and
    based on the determining:
        transferring the incremental checkpoint to the target computing system;
        merging the incremental checkpoint with the checkpoint; and
        transferring the software container from the source computing system to the target computing system.

2. The computer-implemented method of claim 1, wherein the migrating further comprises maintaining, by the process, a stateful session with a client system that begins with the client system communicating with the process at the source computing system and concludes with the client system communicating with the process at the target computing system.

3. The computer-implemented method of claim 1, further comprising enabling the migrating of the software container from the source computing system to the target computing system to be completed within the specified time objective by reducing access to a computing resource for the software container.

4. The computer-implemented method of claim 3, wherein throttling the software container at the source computing system reduces the access to the computing resource for the software container.

5. The computer-implemented method of claim 4, wherein reducing the access to the computer resource for the software container comprises at least one of decreasing processor availability to one or more processes within the software container, decreasing network availability to one or more processes within the software container, decreasing storage input/output bandwidth to one or more processes within the software container, and reducing access to one or more computing resources for a control group associated with one or more processes executing within the software container.

6. The computer-implemented method of claim 1, wherein the software container comprises a sandboxed environment wherein the process executing within the software container performs system calls to an operating system that hosts the software container.

7. The computer-implemented method of claim 1, wherein the incremental checkpoint comprises a representation of a difference between a current state of the process and a most recent previous version of the checkpoint.

8. The computer-implemented method of claim 1, wherein the migrating further comprises finalizing the migration by:
    restoring the checkpoint into a new software container at the target computing system; and
    redirecting a communication path to point to the new software container at the target computing system instead of pointing to the software container at the source computing system.

9. The computer-implemented method of claim 8, wherein redirecting the communication path comprises reassigning, within a software defined network, an internet protocol address previously allocated to the software container at the source computing system to the new software container at the target computing system.

10. The computer-implemented method of claim 1, wherein the checkpoint comprises a stored representation of at least one of:
    a state of application memory of the process;
    a process handle of the process;
    a file handle held by the process; and
    a socket held by the process.

11. A system for performing live migrations of software containers, the system comprising:
    a creation module, stored in memory, that creates a checkpoint of a process in execution within a software container of a source computing system, the checkpoint comprising a representation of a state of the process in execution;

a transferring module, stored in memory, that transfers the checkpoint from the source computing system to a target computing system;

an updating module, stored in memory, that updates the checkpoint by creating an incremental checkpoint of the process in execution, the incremental checkpoint comprising a representation of at least one change in the state of the process;

a prediction module, stored in memory, that predicts that a migration of the software container to the target computing system would be completed within a specified time objective based on the incremental checkpoint of the process in execution; and a finalizing module, stored in memory, that migrates the software container to the target computing system by:
transferring the incremental checkpoint to the target computing system;
merging the incremental checkpoint with the checkpoint; and
transferring the software container from the source computing system to the target computing system; and at least one physical processor configured to execute the creation module, the transferring module, the updating module, the prediction module, and the finalizing module.

12. The system of claim 11, wherein the finalizing module further migrates the software container to the target computing system by having the process in execution maintain a stateful session with a client system that begins with the client system communicating with the process at the source computing system and concludes with the client system communicating with the process at the target computing system.

13. The system of claim 11, wherein the updating module enables the migrating of the software container from the source computing system to the target computing system to be completed within the specified time objective by reducing access to a computing resource for the software container.

14. The system of claim 13, wherein the updating module throttles the software container at the source computing system to reduce the access to the computing resource for the software container.

15. The system of claim 14, wherein reducing the access to the computer resource for the software container comprises at least one of decreasing processor availability to one or more processes within the software container, decreasing network availability to one or more processes within the software container, decreasing storage input/output bandwidth to one or more processes within the software container, and reducing access to one or more computing resources for a control group associated with one or more processes executing within the software container.

16. A non-transitory computer-readable medium comprising one or more computer-readable instructions that, when executed by at least one processor of a computing device, cause the computing device to:

migrate a software container from a source computing system to a target computing system while a process executes within the software container, the migrating comprising:
creating a checkpoint comprising a representation of a state of the process;
transferring the checkpoint to the target computing system;
subsequent to creating the checkpoint, creating an incremental checkpoint comprising a representation of at least one change in the state of the process;
determining, based on the incremental checkpoint, that migrating the software container from the source computing system to the target computing system will be completed within a specified time objective; and
based on the determining:
transferring the incremental checkpoint to the target computing system;
merging the incremental checkpoint with the checkpoint; and
transferring the software container from the source computing system to the target computing system.

17. The non-transitory computer-readable medium of claim 16, wherein the migrating further comprises maintaining, by the process, a stateful session with a client system that begins with the client system communicating with the process at the source computing system and concludes with the client system communicating with the process at the target computing system.

18. The non-transitory computer-readable medium of claim 16, wherein the computer-readable instructions further cause the computing device to enable the migrating of the software container from the source computing system to the target computing system to be completed within the specified time objective by reducing access to a computing resource for the software container.

19. The non-transitory computer-readable medium of claim 18, wherein throttling the software container at the source computing system reduces the access to the computing resource for the software container.

20. The non-transitory computer-readable medium of claim 19, wherein reducing the access to the computer resource for the software container comprises at least one of decreasing processor availability to one or more processes within the software container, decreasing network availability to one or more processes within the software container, decreasing storage input/output bandwidth to one or more processes within the software container, and reducing access to one or more computing resources for a control group associated with one or more processes executing within the software container.

\* \* \* \* \*